United States Patent
Yoshida

(10) Patent No.: US 7,565,172 B2
(45) Date of Patent: Jul. 21, 2009

(54) ADAPTIVE ANTENNA RECEPTION METHOD AND DEVICE

(75) Inventor: Shousei Yoshida, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/560,967

(22) PCT Filed: Jun. 23, 2004

(86) PCT No.: PCT/JP2004/008801

§ 371 (c)(1),
(2), (4) Date: Dec. 16, 2005

(87) PCT Pub. No.: WO2005/001992

PCT Pub. Date: Jan. 6, 2005

(65) Prior Publication Data

US 2006/0286955 A1    Dec. 21, 2006

(30) Foreign Application Priority Data

Jun. 26, 2003    (JP) .............................. 2003-182701

(51) Int. Cl.
*H04M 1/00* (2006.01)

(52) U.S. Cl. ................. 455/562.1; 455/277.2; 455/269; 455/140; 455/575.7; 342/383; 342/367; 375/150; 375/148; 370/342

(58) Field of Classification Search ............... 455/63.4, 455/277.2, 140, 25, 63.1, 13.3, 562.1, 269, 455/575.7; 375/148, 150, 303, 347; 342/383, 342/367, 361; 370/342, 378

See application file for complete search history.

(56) References Cited

U.S. PATENT DOCUMENTS 6,018,643 A * 1/2000 Golemon et al. ........... 455/63.4

(Continued)

FOREIGN PATENT DOCUMENTS

CN    1347205 A    5/2002

(Continued)

OTHER PUBLICATIONS

Shinya Tanaka; et al., "Pilot Symbol-Assisted Decision-Directed Coherent Adaptive Array Diversity for DS-CDMA Mobile Radio Reverse Link," IEICE Trans. Fundamentals, vol. E80-A, No. 12, Dec. 1997, pp. 2445-2454.

*Primary Examiner*—Matthew D Anderson
*Assistant Examiner*—Minh D Dao
(74) *Attorney, Agent, or Firm*—Dickstein, Shapiro, LLP.

(57) ABSTRACT

An adaptive antenna receiver whose follow-up performance is improved with respect to the angle change of the arrival direction of a desired signal. An antenna weight adaptive update section (11-1) adaptively updates the antenna weight according to a signals received by each antenna element and an error signal obtained from a desired signal corrected based on transmission channel estimation. An antenna weight direction constraint section (12-1) performs the constraint process for the antenna weight obtained by the antenna weight adaptive update section (11-1) to maintain the beam gain constant in the arrival direction of the desired signal. A beamformer (2-1) receives the desired signal through an array antenna using the antenna weight which has undergone the constraint process performed by the antenna weight direction constraint section (12-1). A transmission channel estimation section (3-1) estimates the transmission channel of the desired signal received by the beamformer (2-1) to correct the desired signal based on the estimation result.

8 Claims, 8 Drawing Sheets

U.S. PATENT DOCUMENTS

| | | | |
|---|---|---|---|
| 6,064,338 A * | 5/2000 | Kobayakawa et al. | 342/378 |
| 6,141,567 A * | 10/2000 | Youssefmir et al. | 455/562.1 |
| 6,493,379 B1 * | 12/2002 | Tanaka et al. | 375/150 |
| 6,959,169 B2 * | 10/2005 | Miyoshi | 455/63.1 |
| 2001/0019952 A1 * | 9/2001 | Ishida | 455/414 |
| 2002/0045432 A1 * | 4/2002 | Yoshida | 455/276.1 |
| 2002/0135514 A1 | 9/2002 | Yoshida | |

FOREIGN PATENT DOCUMENTS

| | | |
|---|---|---|
| CN | 1369932 A | 9/2002 |
| EP | 1 182 728 A2 | 2/2002 |
| EP | 1 231 720 A2 | 8/2002 |
| GB | 2 336 741 A | 10/1999 |
| JP | 11-251964 | 9/1999 |
| JP | 2000-332666 | 11/2000 |
| JP | 2002-77008 | 3/2002 |
| JP | 2002-237766 | 8/2002 |
| JP | 2002-368520 | 12/2002 |
| JP | 2002-368652 | 12/2002 |

* cited by examiner

FIG. 3
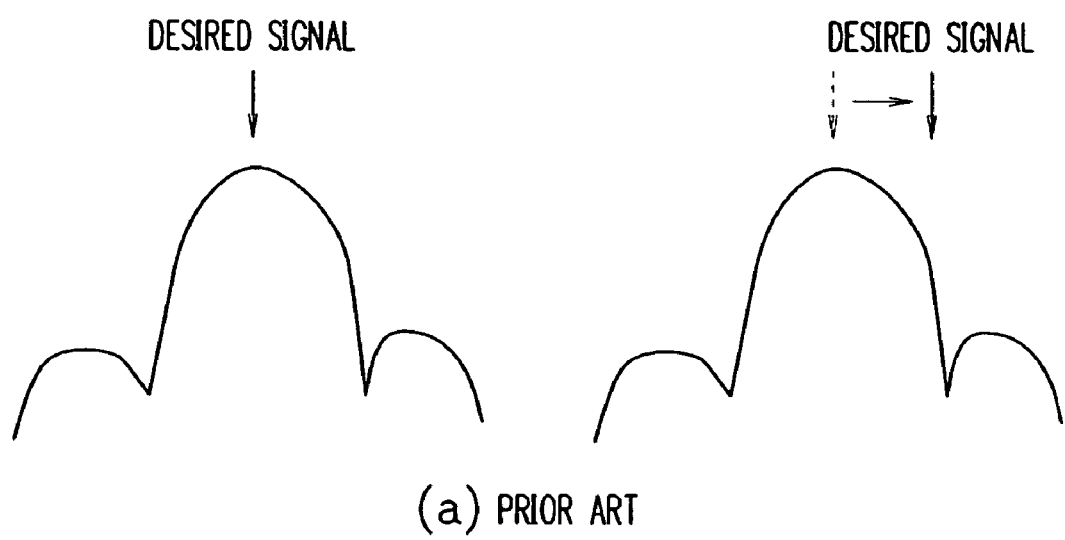
(a) PRIOR ART
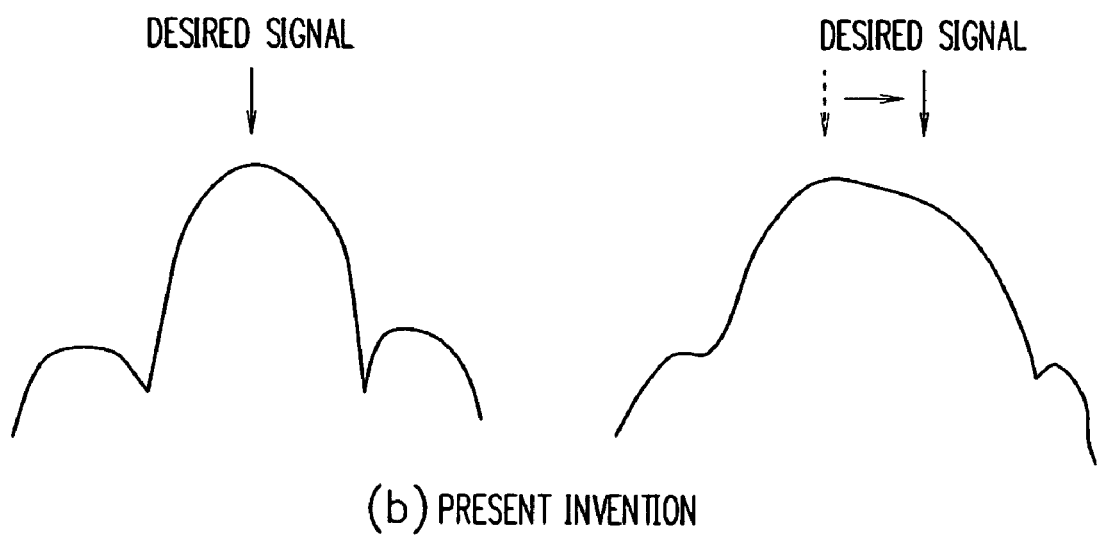
(b) PRESENT INVENTION

F I G. 5
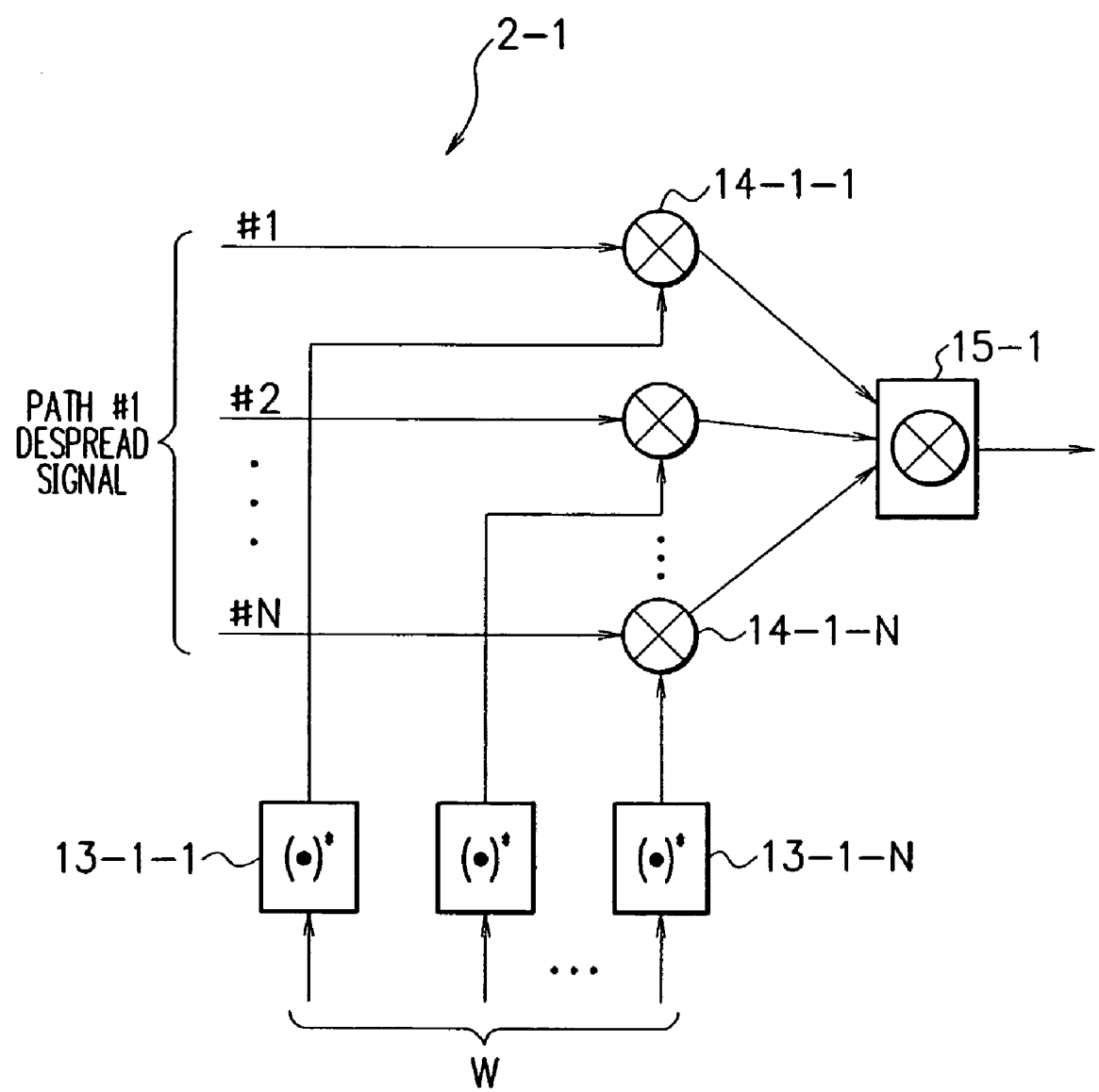

ADAPTIVE ANTENNA RECEPTION METHOD AND DEVICE

TECHNICAL FIELD

The present invention relates to an adaptive antenna receiver, and more particularly, to an adaptive antenna receiver for adaptively forming am antenna directivity or directional beam in a CDMA system to receive a desired signal from a particular user while suppressing interference signals from other users.

BACKGROUND ART

The CDMA (Code Division Multiple Access) system has the potential of increasing the subscriber capacity with respect to the radio frequency and attracts attention as a radio access system for a mobile communication cellular system.

In the CDMA system, however, has a problem in that, when a base station receives a desired signal from a particular user, interference occurs with other signals from users who access the same base station simultaneously with the particular user. To eliminate such interference signals to properly receive a desired signal, an array antenna is usable.

An array antenna comprises a plurality of antenna elements. The array antenna weights each antenna element by a complex number to control the amplitude and phase of a signal received by each antenna element, thereby forming a directional beam. With the directional beam formed to be suitable for receiving a desired signal, the array antenna can properly receive the desired signal and also suppress interference signals from other users. An adaptive array antenna is the one that adaptively controls such a directional beam.

In a base station, desired signals are received through a multipath channel. The adaptive array antenna directs high beam gains to the respective path directions of desired signals as well as directing a point (null) where the gain is extremely low to the direction of an interference signal to control weighting operation so that SINR (Signal to Interference and Noise Ratio) is maximized.

There is described a conventional adaptive antenna receiver in Non Patent Document 1.

FIG. 1 is a block diagram showing the construction of a conventional adaptive antenna receiver. Referring to FIG. 1, the conventional adaptive antenna receiver comprises path receivers 101-1 to 101-L (L: a positive integer), a combiner 106, a determination unit 107, a switch 108, and a subtractor 109.

There are provided L pieces of the path receivers 101-1 to 101-L to perform multipath combining correspondingly to a plurality of multipath transmission channels in a mobile communication environment.

All of the path receivers 101-1 to 101-L have the same construction.

The path receivers 101-1 includes a beamformer 102-1, a transmission channel estimation section 103-1, a complex conjugate operation section 104-1, multipliers 105-1 and 110-1, and an antenna weight adaptive update section 111-1.

The beamformer 102-1 receives as input N despread signals obtained by despreading signals received by respective antenna elements #1 to #N (N: the number of antenna elements included in an array antenna) in path #1 timing with the spreading code of a desired user. The beamformer 102-1 performs the weighting and combining of the N despread signals to form a directional beam for the path #1.

FIG. 2 is a block diagram showing the construction of the conventional beamformer. Referring to FIG. 2, the beamformer 102-1 includes complex conjugate operation sections 112-1-1 to 112-1-N, multipliers 113-1-1 to 113-1-N, and a combiner 114-1. The other beamformers 102-2 to 102-L each have the same construction as described above.

The complex conjugate operation sections 112-1-1 to 112-1-N calculate the complex conjugates of N antenna weights (W) obtained from the antenna weight adaptive update section 111-1, respectively, and feed them to the multipliers 113-1-1 to 113-1-N.

Each of the multipliers 113-1-1 to 113-1-N multiplies each despread signal of the path #1 by the complex conjugate of the antenna weight fed from corresponding one of the complex conjugate operation sections 112-1-1 to 112-1-N, and feeds the product to the combiner 114-1.

The combiner 114-1 adds up all the output of the multipliers 113-1-1 to 113-1-N.

Besides, the transmission channel estimation section 103-1 shown in FIG. 1 performs transmission channel estimation based on the output of the beamformer 102-1 to feed a transmission channel estimation value to the complex conjugate operation section 104-1 and the multiplier 110-1. Incidentally, the transmission channel estimation indicates the estimation of changes in radiowave propagation condition based on the path reception state. The transmission channel estimation value thereby obtained is used to compensate the changes in radiowave propagation condition (transmission channel correction).

The complex conjugate operation section 104-1 calculates the complex conjugate of the transmission channel estimation value received from the transmission channel estimation section 103-1 to feed it to the multiplier 105-1.

The multiplier 105-1 multiplies the output of the beamformer 102-1 by the complex conjugate of the transmission channel estimation value to correct phase variation (transmission channel correction) as well as to perform weighting operation for maximum ratio combining. The maximum ratio combining is such a weighted combining method to maximize The SINR of a signal after multipath combining.

In the conventional path receivers 101-1 shown in FIG. 1, the function for phase correction based on the transmission channel estimation is separated from the antenna weight control. Therefore, in the antenna weight control, there is no need to correct phase variation caused by the phasing of a desired signal, and it is just required to correct phase variation depending only on the arrival direction of the signal. Thus, stable beamforming can be performed.

The combiner 106 adds up all the output of the multipliers 105-1 to 105-L of the respective path receivers 101-1 to 101-L to perform path combining, thereby-generating a demodulation signal.

The determination unit 107 determines a transmission symbol with the highest possibility based on the demodulation signal obtained by the combiner 106.

The switch 108 selects either a known reference signal or the transmission symbol from the determination unit 107 to feed the selected one as a reference signal to the subtractor 109. When having been provided with a known reference signal, the switch 108 selects the signal. On the other hand, when having been provided with no known reference signal, the switch 108 selects the transmission symbol from the determination unit 107.

The subtractor 109 subtracts the demodulation signal generated by the combiner 106 from a reference signal, and feeds the difference as an error signal to the multipliers 110-1 to 110-L of all the path receivers 101-1 to 101-L. On this occasion, the subtractor 109 uses as the reference signal a value obtained by multiplying the reference signal from the switch 108 by a reference signal level, which will be described later.

The multiplier 110-1 of the path receiver 101-1 multiplies the error signal from the subtractor 109 by the transmission channel estimation value from the transmission channel estimation section 103-1 to feed the product to the antenna weight adaptive update section 111-1.

The antenna weight adaptive update section 111-1 adaptively calculates the antenna weight based on the error signal multiplied by the transmission channel estimation value and the N despread signals of the path #1, and feeds the calculation result to the beamformer 102-1 to perform the adaptive control. In general, minimum mean square error (MMSE) control is used for the adaptive control. As adaptive update algorithms for antenna weighting factors using error signals, LMS (Least Mean Square), NLMS (Normalized LMS), and RLS (Recursive Least Square) algorithms are known.

For example, in Non Patent Document 1, there is described a technique in which the antenna weight is updated with the NLMS algorithm. The antenna weight w(i, m) (where i is the path number, and m is the symbol number) can be calculated by the following update equation (Equation 1):

(Equation 1)

$$w(i, m+1) = w(i, m) + \frac{\lambda}{p(i, m)} x(i, m) h(i, m) e*(m) \quad (1)$$

where x(i, m) is the despread signal of a signal received by each antenna, p(i, m) is the total power of the despread signals of the respective antennas, h(i, m) is the transmission channel estimation value, and λ is the step size. Incidentally, * is the conjugate complex number.

If an error signal is denoted by e(m) and a received signal is denoted by z(m), then, the error signal e(m) can be expressed by the following Equation (2):

$$e(m) = A(m)\hat{z}(m) - z(m) \quad \text{(Equation 2)}$$

where ẑ(m) is the reference signal (a known reference signal or determination signal), and A(m) is the reference signal level.

The reference signal level A(m) is calculated based on the despread signal of each antenna element input to the beamformer 102-1 (e.g., see Patent Document 1). The reception level of the despread signal input to the beamformer 102-1 is not affected by the beam gain, and desirable as a reference to calculate the reference signal level A(m).

In an application of the adaptive antenna receiver, a CDMA (Code Division Multiple Access) signal is received by a plurality of array antennas (sub-arrays) whose phasings are independent of one another to achieve the directivity control effect and the diversity effect.

There has been proposed a technique in which a common antenna weight is used for directivity forming in the respective sub-arrays and adaptive control characteristics are improved by applying the determination error signals of all the sub-arrays to the antenna weight control (see Patent Document 2).

In another application of the adaptive antenna receiver, a signal of a beam formed by a multi-beamformer is used for path detection. Thereby, path detection characteristics are not deteriorated even if there are a large number of antennas.

There has been proposed a technique in which the despread output of a beam formed by a multi-beamformer is weighted and combined for correcting phase variation to thereby detect each path. The paths are combined to obtain a demodulation signal. The weight used for weighted combining is adaptively updated based on the determination error signal obtained by the inverse correction of the phase variation and the beam despread output (see Patent Document 3). With this technique, the excellent path detection characteristics and reception demodulation characteristics can be realized.

Patent Document 1: Japanese Patent Laid-Open No. 2002-77008

Patent Document 2: Japanese Patent Laid-Open No. 2002-368520

Patent Document 3: Japanese Patent Laid-Open No. 2002-368652

Non Patent Document 1: Tanaka, Sawahashi, Adachi, et al., "Pilot Symbol-Assisted Decision-Directed Coherent Adaptive Array Diversity for DS-CDMA Mobile Radio Reverse Link", IEICE Trans., vol. E80-A, pp. 2445-2454, December 1997

DISCLOSURE OF THE INVENTION

Problems that the Invention is to Solve

With the typical conventional adaptive antenna receiver as shown in FIG. 1, it is possible to form a directional beam in the arrival direction of a desired signal. In addition, in the applications as described in Patent Documents 1 and 2, a desired signal can be further properly received. These effects, however, can be achieved under the condition of good follow-up performance.

When there is a significant change in the angle of the arrival direction of a desired signal, the gain of the desired signal may be reduced due to the gap between the arrival direction of the desired signal and the direction of a directional beam.

FIG. 3 is a diagram showing the relation between the directional beam of an adaptive array antenna and the arrival direction of a desired signal. FIG. 3(a) shows the relation between them according to the prior art, while FIG. 3(b) shows the relation according to the present invention. In the conventional adaptive array antenna, the direction of a directional beam is controlled so that the maximum gain can be obtained in the arrival direction of a desired wave. However, no consideration is taken of the follow-up performance, and, as shown in FIG. 3(a), if the arrival direction of a desired signal has changed, the arrival direction deviates from the beam direction. Consequently, the gain of the desired signal is substantially reduced. As a result, a correct error signal is not detected, and the follow-up performance is impaired. Further, in a worse-case scenario, the angle change of the arrival direction cannot be followed up and the desired signal is lost, which may cause step out.

It is therefore an object of the present invention to provide, in consideration of the follow-up performance of a directional beam, an adaptive antenna receiver whose follow-up performance is improved with respect to the angle change of the arrival direction of a desired signal.

Means of Solving the Problems

In accordance with the present invention, to achieve the object mentioned above, there is provided an adaptive antenna receiver, which adaptively forms the directional beam of an array antenna consisting of a plurality of antenna elements to receive a desired signal while suppressing interference signals in multiplexed signals transmitted from a plurality of senders, and corrects the desired signal based on transmission channel estimation, the adaptive antenna receiver comprising:

an antenna weight adaptive update means for adaptively updating the antenna weight according to signals received by the respective antenna elements and an error signal obtained from the desired signal corrected based on the transmission channel estimation;

an antenna weight direction constraint means for performing the constraint process for the antenna weight obtained by the antenna weight adaptive update means to maintain the beam gain constant in the arrival direction of the desired signal;

a beamformer for receiving the desired signal through the array antenna using the antenna weight which has undergone the constraint process performed by the antenna weight direction constraint means; and a transmission channel estimation means for estimating the transmission channel of the desired signal received by the beamformer to correct the desired signal based on the estimation result.

With this construction, the transmission channel estimation means corrects a transmission channel, the antenna weight adaptive update means adaptively controls the antenna weight using signals received by the respective antenna elements, and the antenna weight direction constraint means corrects the antenna weight. That is, the transmission channel correction is performed independently of the antenna weight control. Consequently, according to the present invention, the antenna weight does not contain the components of the transmission channel correction, and is adaptively controlled by phase correction depending only on signal arrival direction. Thereby, the antenna weight direction constraint means can correct the antenna weight in such a manner as to maintain the beam gain constant in the arrival direction of a desired signal.

Incidentally, the antenna weight direction constraint means performs the constraint process for the antenna weight using a direction vector that indicates the arrival direction of the desired signal.

In this case, since the antenna weight direction constraint means corrects the antenna weight based on a direction vector to maintain the beam gain constant in the arrival direction of the desired signal, the gain of the desired signal component of beam output remains constant.

The adaptive antenna receiver may further comprises:

an adjacent antenna correlation detection means for obtaining a correlation value between signals received by the respective adjacent antenna elements;

an antenna correlation averaging means for calculating the average of the correlation values obtained by the adjacent antenna correlation detection means;

an arctangent calculation means for calculating the arctangent of the average obtained by the antenna correlation averaging means to find the phase; and a direction vector calculation means for calculating a direction vector based on the phase obtained by the arctangent calculation means.

With this construction, the antenna correlation averaging means averages the correlations between the respective adjacent antenna elements obtained by the adjacent antenna correlation detection means. The arctangent calculation means and the direction vector calculation means obtains a direction vector based on the average value. Thus, the direction vector of a desired signal can be obtained based on the correlation between the adjacent antenna elements with simple construction and operation.

EFFECT OF THE INVENTION

As is described above, in accordance with the present invention, the transmission channel estimation means corrects a transmission channel. The antenna weight adaptive update means adaptively controls the antenna weight using signals received by the respective antenna elements, and the antenna weight direction constraint means corrects the antenna weight. In other words, the transmission channel correction is performed independently of the antenna weight control. Consequently, the antenna weight does not contain the components of the transmission channel correction, and is adaptively controlled by phase correction depending only on signal arrival direction. Thereby, the antenna weight direction constraint means can correct the antenna weight in such a manner as to maintain the beam gain constant in the arrival direction of a desired signal. Thus, the gain of the desired signal component of beam output remains constant, resulting in an improvement in the follow-up performance of a directional beam. In addition, step out can be prevented.

Besides, the antenna weight direction constraint means corrects the antenna weight based on a direction vector to maintain the beam gain constant in the arrival direction of a desired signal. Therefore, the gain of the desired signal component of beam output remains constant.

In addition, the antenna correlation averaging means averages the correlations between the respective adjacent antenna elements obtained by the adjacent antenna correlation detection means. The arctangent calculation means and the direction vector calculation means obtains a direction vector based on the average value. Thus, the direction vector of a desired signal can be obtained based on the correlation between the adjacent antenna elements with simple construction and operation.

BEST MODE FOR CARRYING OUT THE INVENTION

Referring now to the drawings, a description of a preferred embodiment of the present invention will be given in detail.

FIG. 4 is a block diagram showing the construction of an adaptive antenna receiver according to an embodiment of the present invention. Referring to FIG. 4, the adaptive antenna receiver comprises path receivers 1-1 to 1-L, a combiner 6, a determination unit 7, a switch 8, and a subtractor 9.

There are provided L pieces of the path receivers 1-1 to 1-L to perform multipath combining correspondingly to multipath propagation channels in a mobile communication environment. All of the path receivers 1-1 to 1-L have the same construction.

The path receivers 1-1 includes a beamformer 2-1, a transmission channel estimation section 3-1, a complex conjugate operation section 4-1, multipliers 5-1 and 10-1, an antenna weight adaptive update section 11-1, an antenna weight direction constraint section 12-1, and a direction vector generator 16-1.

The beamformer 2-1 receives as input N despread signals obtained by despreading signals received by respective antenna elements #1 to #N (N: the number of antenna elements included in an array antenna) in path #1 timing with the spreading code of a desired user. The beamformer 2-1 performs the weighting and combining of the N despread signals to form a directivity or directional beam for the path #1.

FIG. 5 is a block diagram showing the construction of the beamformer depicted in FIG. 4. Referring to FIG. 5, the beamformer 2-1 includes complex conjugate operation sections 13-1-1 to 13-1-N, multipliers 14-1-1 to 14-1-N, and a combiner 15-1. The other beamformers 2-2 to 2-L each have the same construction as described above.

The complex conjugate operation sections 13-1-1 to 13-1-N calculate the complex conjugates of N antenna weights (W) obtained from the antenna weight direction constraint section 12-1, respectively, and feed them to the multipliers 14-1-1 to 14-1-N.

Each of the multipliers 14-1-1 to 14-1-N multiplies each despread signal of the path #1 by the complex conjugate of the antenna weight fed from corresponding one of the complex conjugate operation sections 13-1-1 to 13-1-N, and feeds the product to the combiner 15-1.

The combiner 15-1 adds up all the output of the multipliers 14-1-1 to 14-1-N.

Besides, the transmission channel estimation section 3-1 shown in FIG. 4 performs transmission channel estimation based on the output of the beamformer 2-1 to feed a transmission channel estimation value to the complex conjugate operation section 4-1 and the multiplier 10-1. Incidentally, the transmission channel estimation indicates the estimation of changes in radiowave propagation condition based on the path reception state. The transmission channel estimation value thereby obtained is used to compensate the changes in radiowave propagation condition (transmission channel correction).

The complex conjugate operation section 4-1 calculates the complex conjugate of the transmission channel estimation value received from the transmission channel estimation section 3-1 to feed it to the multiplier 5-1.

The multiplier 5-1 multiplies the output of the beamformer 2-1 by the complex conjugate of the transmission channel estimation value to correct phase variation (transmission channel correction) as well as to perform weighting operation for maximum ratio combining. The maximum ratio combining is such a weighted combining method to maximize SINR (Signal to Interference and Noise Ratio) of a signal after multipath combining.

In the path receivers 1-1, the function for phase correction based on the transmission channel estimation is separated from the antenna weight control. Therefore, in the antenna weight control, there is no need to correct phase variation caused by the phasing of a desired signal, and it is just required to correct phase variation depending only on the arrival direction of the signal. Thus, stable beamforming can be performed.

The combiner 6 adds up all the output of the multipliers 5-1 to 5-L of the respective path receivers 1-1 to 1-L to perform path combining, thereby generating a demodulation signal.

The determination unit 7 determines a transmission symbol with the highest possibility based on the demodulation signal obtained by the combiner 6 to feed it to the switch 8.

The switch 8 selects either a known reference signal or the transmission symbol from the determination unit 7 to feed the selected one as a reference signal to the subtractor 9. When having been provided with a known reference signal, the switch 8 selects the signal. On the other hand, when having been provided with no known reference signal, the switch 8 selects the transmission symbol from the determination unit 107.

The subtractor 9 subtracts the demodulation signal generated by the combiner 6 from a reference signal, and feeds the difference as an error signal to the multipliers 10-1 to 10-L of all the path receivers 1-1 to 1-L. On this occasion, the subtractor 9 uses as the reference signal a value obtained by multiplying the reference signal from the switch 8 by a reference signal level, which will be described later.

The multiplier 10-1 of the path receiver 1-1 multiplies the error signal from the subtractor 9 by the transmission channel estimation value from the transmission channel estimation section 3-1 to feed the product to the antenna weight adaptive update section 11-1.

The antenna weight adaptive update section 11-1 adaptively calculates the antenna weight W' based on the error signal multiplied by the transmission channel estimation value and the N despread signals of the path #1, and feeds the calculation result to the antenna weight direction constraint section 12-1.

In general, minimum mean square error (MMSE) control is used to calculate the antenna weight W'. As adaptive update algorithms for antenna weighting factors using error signals, LMS (Least Mean Square), NLMS (Normalized LMS), and RLS (Recursive Least Square) algorithms are known.

As is described above, the antenna weight w(i, m) (where i is the path number, and m is the symbol number) can be calculated by the update equation (Equation 1).

Besides, if an error signal is denoted by e(m) and a reference signal level is denoted by A(m), then, the error signal e(m) can be expressed by Equation (2).

The reference signal level A(m) is calculated based on the despread signal of each antenna element input to the beamformer 2-1. The reception level of the despread signal input to the beamformer 2-1 is not affected by the beam gain, and desirable as a reference to calculate the reference signal level A(m).

The aforementioned construction of the adaptive antenna receiver is similar to that of the conventional one shown in FIG. 1 except for the presence of the antenna weight direction constraint section 12-1 and direction vector generator 16-1, which are characteristic features of the present invention.

The direction vector generator 16-1 obtains a direction vector based on the arrival direction of a desired signal. The direction vector is used for the antenna weight direction constraint process. The direction vector as used herein indicates a vector which is directed in the arrival direction of a desired signal with a size of N.

FIG. 6 is a diagram showing the relation between an array antenna and the arrival directions of desired signals. In FIG. 6, ● indicates an antenna element, and an arrow indicates a desired signal. Antenna elements are arrayed with a spacing of d. The arrival direction of a desired signal φ is indicated by an angle to the line perpendicular to the direction in which the antenna elements are arrayed. In this case, component $c_n$ (n: an antenna number of each of antenna elements #1 to #N) corresponding to each antenna element in a direction vector $c=(c_1, c_2, \ldots, c_n, \ldots, c_N)$ can be obtained by the following Equation (3):

$$c_n = \exp[j2\pi(n-1)(d/\lambda)\sin(\phi)] \quad \text{(Equation 3)}$$

where λ is carrier wavelength.

The direction vector c expressed as above is also called Special Signature, and is a signal typifies a desired signal. As mentioned above, the direction vector c, from which the influences of modulation, level fluctuation, etc. are removed, indicates only the arrival direction of a desired signal.

The antenna weight direction constraint section 12-1 performs the process of correcting the antenna weight (direction constraint process) using the direction vector c to maintain the beam gain of a desired signal constant in the arrival direction of the desired signal.

In the case of a path having path number i with symbol number m, if the direction vector is denoted by c(i, m) and the antenna weight obtained by the antenna weight adaptive update section 11-1 is denoted by w'(i, m), then, the antenna weight w'(i, m) which has undergone the direction constraint process is obtained by the following Equation (4):

(Equation 4)

$$W'(i, m+1) = \left(I - \frac{c(i,m)c^H(i,m)}{N}\right)W(i, m+1) + \frac{c(i,m)}{N} \quad (4)$$

where I is the identity matrix or unit matrix, and H is Hermitian conjugate operation.

FIG. 7 is a diagram for explaining the direction constraint process performed by the antenna weight direction constraint section. The direction constraint process indicates the process of obtaining an antenna weight vector W': an antenna weight vector W from the antenna weight adaptive update section 11-1 projected on a constraint plane in the N-dimensional antenna weight vector space. In FIG. 7, the antenna weight w'(m+1) is obtained from the antenna weight w(m+1) by the direction constraint process.

The constraint plane can be expressed by the following Equation (5):

$$w'^H c = 1 \quad \text{(Equation 5)}$$

Thereby, the correlation between the antenna weight w' and direction vector c is adjusted to be constant.

The gain of a desired signal received with the antenna weight w' can be expressed by the correlation between the antenna weight w' and direction vector c. If the antenna weight w' is adjusted so that the correlation is constant, i.e., the condition of Equation 5 is satisfied, the gain of the desired signal received with the antenna weight w' remains constant. Incidentally, the direction of the antenna weight w' corresponds to that of the direction vector c if there is no interference. If any, the direction of the antenna weight w' deviates from that of the direction vector c.

The antenna weight vector w'(i, m) that moves on the constraint plane of FIG. 7 satisfies the condition of Equation 5, and therefore, the beam gain in the arrival direction of a desired signal is always constant. Thus, the gain of the desired signal component of beam output remains constant.

FIG. 8 is a block diagram showing the construction of the antenna weight direction constraint section. Referring to FIG. 8, the antenna weight direction constraint section 12-1 includes a correlation unit 16-1, a divider 17-1, a multiplier 18-1, a subtractor 19-1 and an adder 20-1.

The correlation unit 16-1 obtains a correlation value (scalar) between the antenna weight w(i, m+1) from the antenna weight adaptive update section 11-1 and direction vector c(i, m) from the direction vector generator 16-1.

The divider 17-1 divides the direction vector c(i, m) by N.

The multiplier 18-1 multiplies the correlation value from the correlation unit 16-1 by c(i, m)/N obtained by the divider 17-1 to find a vector $c(i, m)[c^H(i, m)w(i, m+1)]/N$.

The subtractor 19-1 subtracts the vector $c(i, m)[c^H(i, m)w(i, m+1)]/N$ obtained by the multiplier 18-1 from the antenna weight w(i, m)

The adder 20-1 adds c(i, m)/N from the divider 17-1 to the output of the subtractor 19-1 to obtain the direction-constrained antenna weight w'(i, m+1).

As set forth hereinabove, in the adaptive antenna receiver of this embodiment, the antenna weight adaptive update section 11-1 adaptively controls the antenna weight using the despread signal of each antenna element. The antenna weight direction constraint section 12-1 performs the direction constraint process for the antenna weight to maintain the beam gain constant in the arrival direction of a desired signal. The beamformer 2-1 performs the weighting and combining of the despread signals of the respective antenna elements using the adaptively controlled antenna weight which has undergone the direction constraint process. The transmission channel estimation section 3-1 obtains a transmission channel estimation value based on the output of the beamformer 2-1. The complex conjugate operation section 4-1 obtains the complex conjugate of the transmission channel estimation value. The output of the beamformer 2-1 is multiplied by the complex conjugate. The combiner 6 performs the multipath combining of signals received through respective paths which have been subjected to transmission channel correction, thereby generating a demodulation signal. That is, the transmission channel correction is performed independently of the antenna weight control.

Accordingly, the antenna weight does not contain the components of the transmission channel correction, and is adaptively controlled by phase correction depending on signal arrival direction, i.e., phase correction based on a direction vector. Thereby, the antenna weight direction constraint section 12-1 can perform the direction constraint process.

Consequently, in this embodiment, the beam gain in the arrival direction of a desired signal can be maintained constant by the direction constraint process as shown in FIG. 3(b). Thus, the gain of the desired signal component of beam output remains constant, which enables the accurate extraction of an error signal and an improvement in the follow-up performance of a directional beam. In addition, step out can be prevented.

In the following, another embodiment of the present invention will be described referring to the drawing.

FIG. 9 is a block diagram showing the construction of an adaptive antenna receiver according to another embodiment of the present invention. Referring to FIG. 9, the path receiver 1-1 has essentially the same construction as described previously in connection with FIG. 4 except that the direction vector generator 16-1 is replaced by a direction vector generator 30-1.

The direction vector generator 30-1 includes an each antenna signal in-phase averaging section 31-1, an adjacent antenna correlation detector 32-1, an antenna correlation averaging section 33-1, an arctangent calculator 34-1, and a direction vector calculator 35-1.

The each antenna signal in-phase averaging section 31-1 performs vector addition for a plurality of symbols of a despread signal rendered in phase with respect to each antenna element to thereby improve the SINR of a received signal. On this occasion, if a known pilot signal is employed, in-phase addition can be used by the removal of modulation with a known symbol (known reference signal). Besides, the effect of the SINR improvement is enhanced as the average number of in-phase symbols increase. However, the average number of symbols is limited when there is a phase variation due to phasing or the like.

The adjacent antenna correlation detector 32-1 detects the correlation between signals received by adjacent antenna elements. More specifically, the correlation is obtained by multiplying a signal received by an antenna element with antenna number n by the complex conjugate signal of a signal received by an antenna element with antenna number n−1. Thus, the output (R(i, n, l)) of the adjacent antenna correlation detector 32-1 can be expressed by the following Equation (6):

$$R(i, n, l) = Z_{EL}(i, n, l)Z^*_{EL}(i, n-1, l) \quad \text{(Equation 6)}$$

where i is the path number, n is the antenna number, l is the output number from the each antenna signal in-phase averaging section 31-1, $Z_{EL}(i, n, l)$ is the value of a received signal with path number i, antenna number n and output number l from the each antenna signal in-phase averaging section 31-1, and * is the conjugate complex number of the received signal value.

The antenna correlation averaging section 33-1 averages the output (R(i, n, l)) of the adjacent antenna correlation detector 32-1 using the following Equation 7:

(Equation 7)

$$R_{AV}(i, l) = \frac{1}{N-1} \sum_{n=2}^{N} R(i, n, l) \quad (7)$$

Further, if necessary, the output ($R_{AV}(i, l)$) obtained by Equation 7 may be time-averaged. For example, if weighted averaging is performed with a forgetting coefficient λ, $R_{AV}(i, l)$ is expressed by the following Equation 8:

$$R_{AV}(i,l)=(1-\lambda)R_{AV}(i,l)+\lambda R_{AV}(i,l-1) \quad \text{(Equation 8)}$$

The arctangent calculator 34-1 calculates the phase θ(i, l) of $R_{AV}(i, l)$ using the following Equation 9:

(Equation 9)

$$\theta(i, l) = \tan^{-1} \frac{\text{Im}[R_{AV}(i, l)]}{\text{Re}[R_{AV}(i, l)]} \quad (9)$$

The direction vector calculator 35-1 calculates a direction vector $c_n(i, l)$ using the following Equation 10:

$$c_n(i,l)=\exp[j(n-1)\theta(i,l)] \quad \text{(Equation 10)}$$

where n is the antenna number

Incidentally, the arctangent calculator 34-1 and the direction vector calculator 35-1 may previously make a table of the correspondence between input and output, and refer the table without performing the calculations to reduce the amount of operations.

As set forth hereinabove, according to this embodiment, the each antenna signal in-phase averaging section 31-1 improves the SINR of each despread signal. The adjacent antenna correlation detector 32-1 detects the correlation between respective adjacent antenna elements. The antenna correlation averaging section 33-1 calculates the average of the correlations. The arctangent calculator 34-1 calculates the phase of the average correlation. The direction vector calculator 35-1 calculates a direction vector from the phase. Thus, the direction vector of a desired signal can be obtained based on the correlation between adjacent antenna elements with simple construction and operation.

BRIEF DESCRIPTION OF THE DRAWINGS

FIG. 3 is a diagram showing the relation between the directional beam of an adaptive array antenna and the arrival direction of a desired signal.

FIG. 5 is a block diagram showing the construction of a beamformer depicted in FIG. 4.

DESCRIPTION OF CODES

Figure 1:
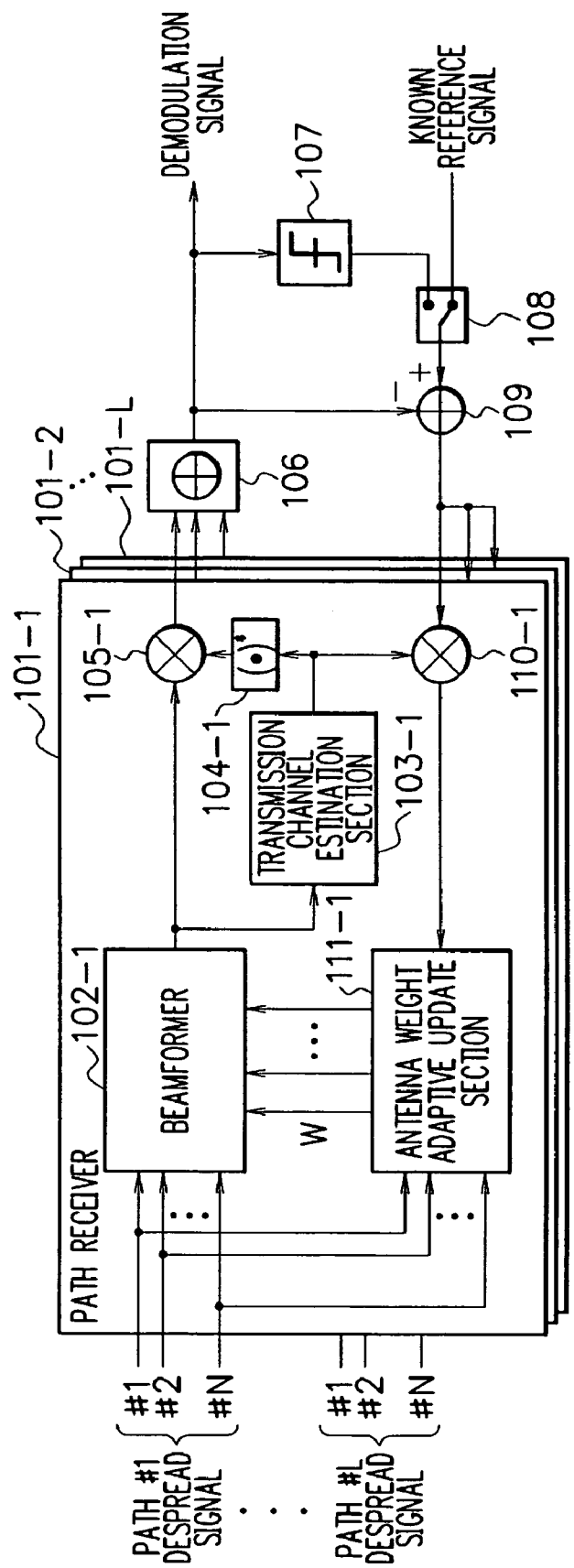
FIG. 1 is a block diagram showing the construction of a conventional adaptive antenna receiver.
Figure 2:
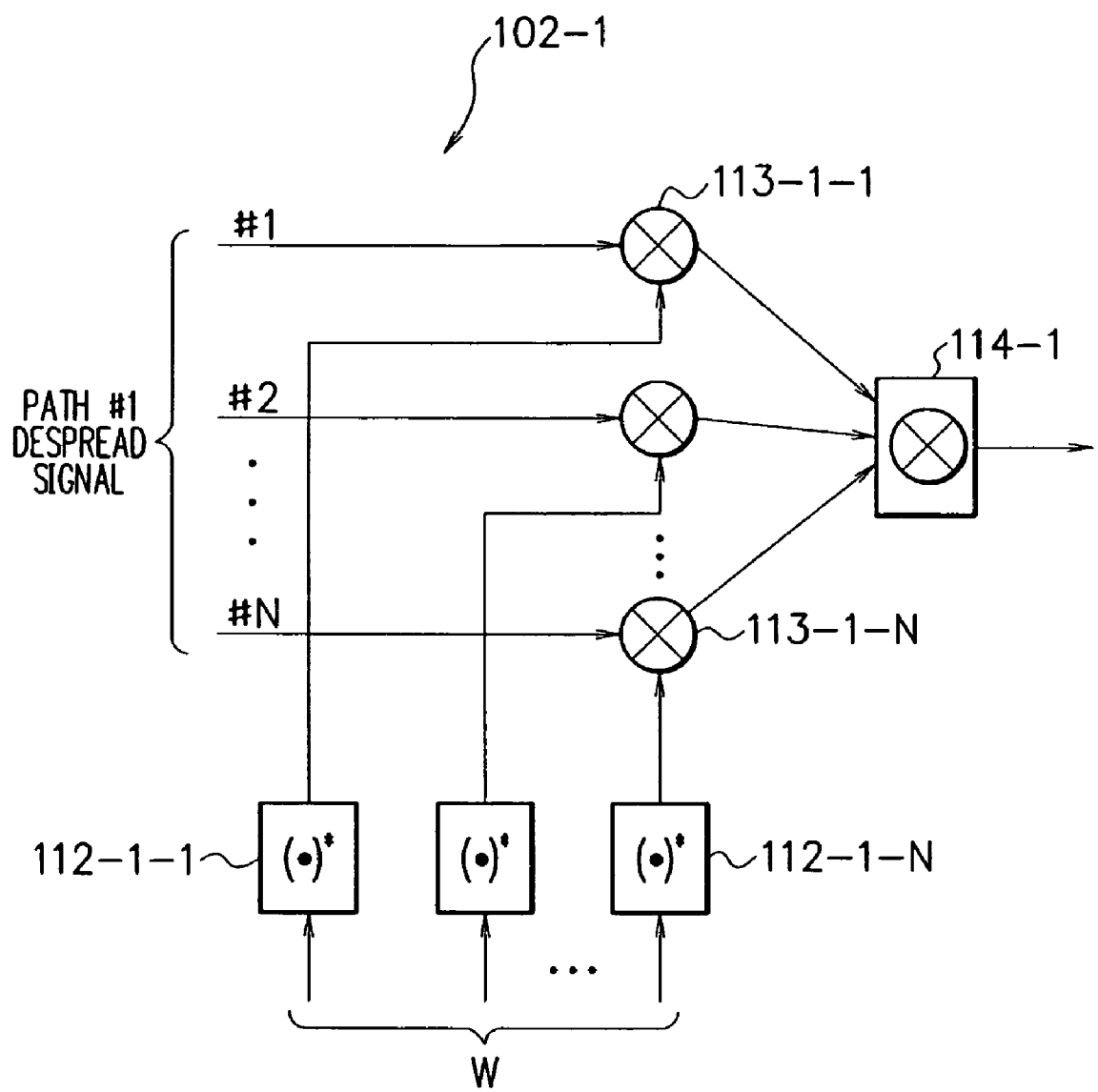
FIG. 2 is a block diagram showing the construction of a conventional beamformer.
Figure 4:
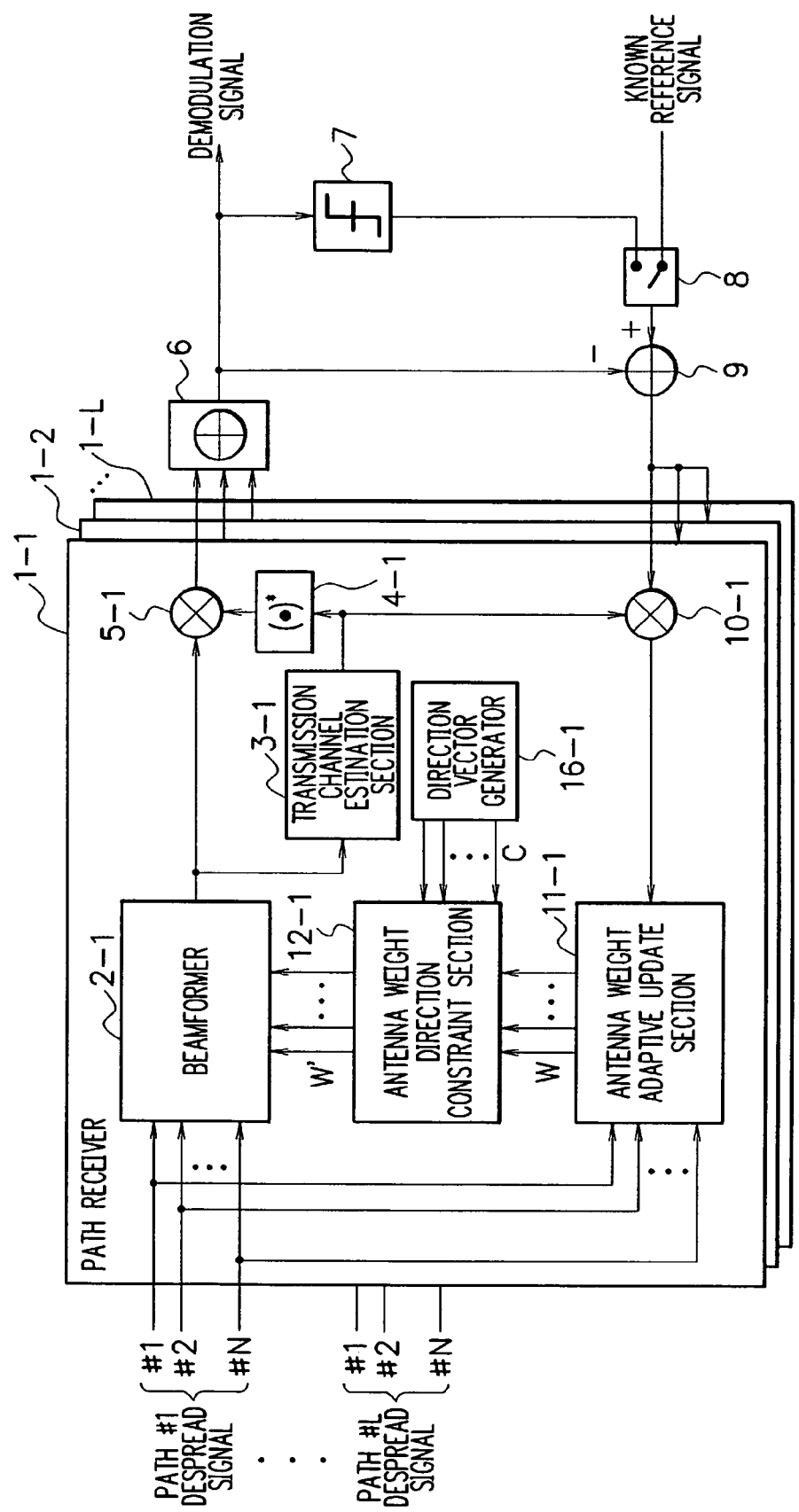
FIG. 4 is a block diagram showing the construction of an adaptive antenna receiver according to an embodiment of the present invention.
Figure 6:
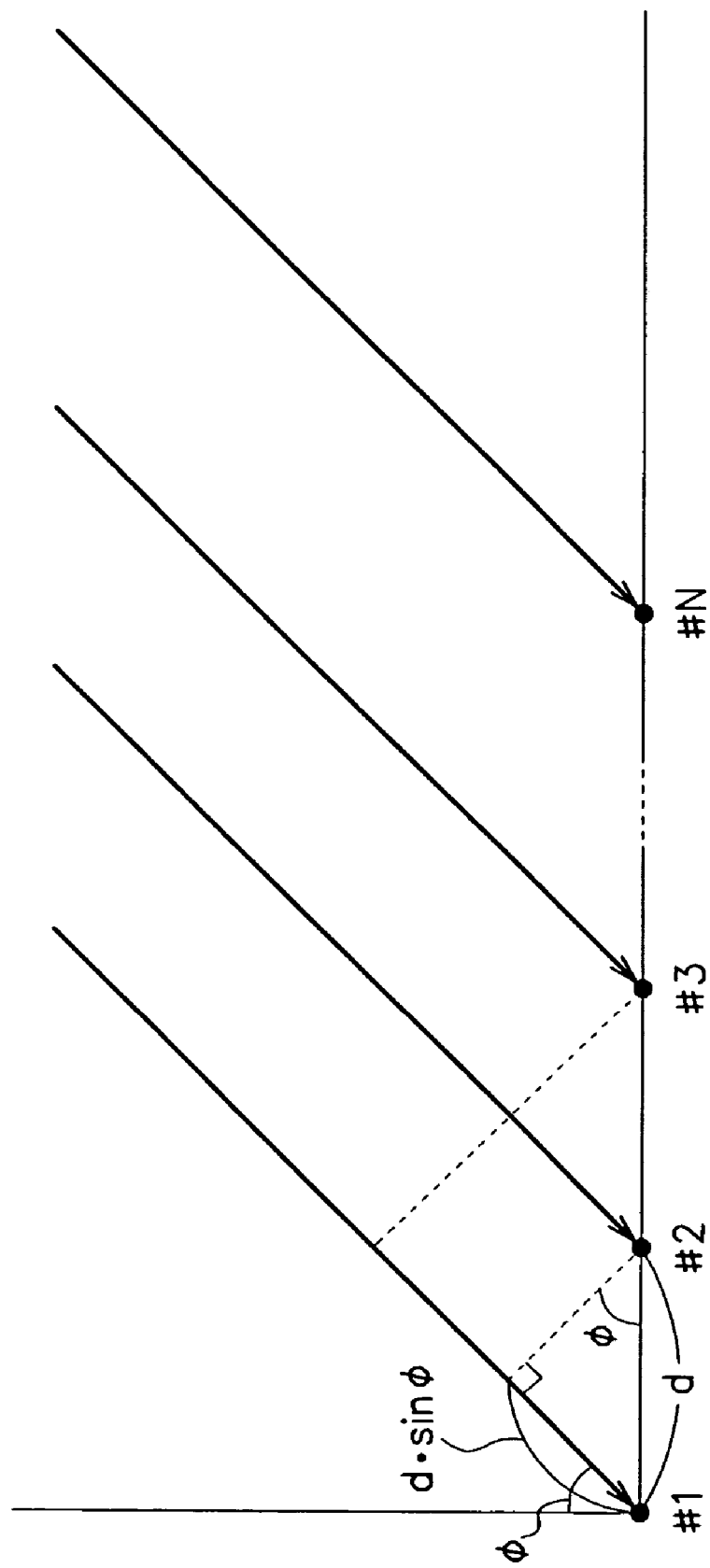
FIG. 6 is a diagram showing the relation between an array antenna and the arrival directions of desired signals.
Figure 7:
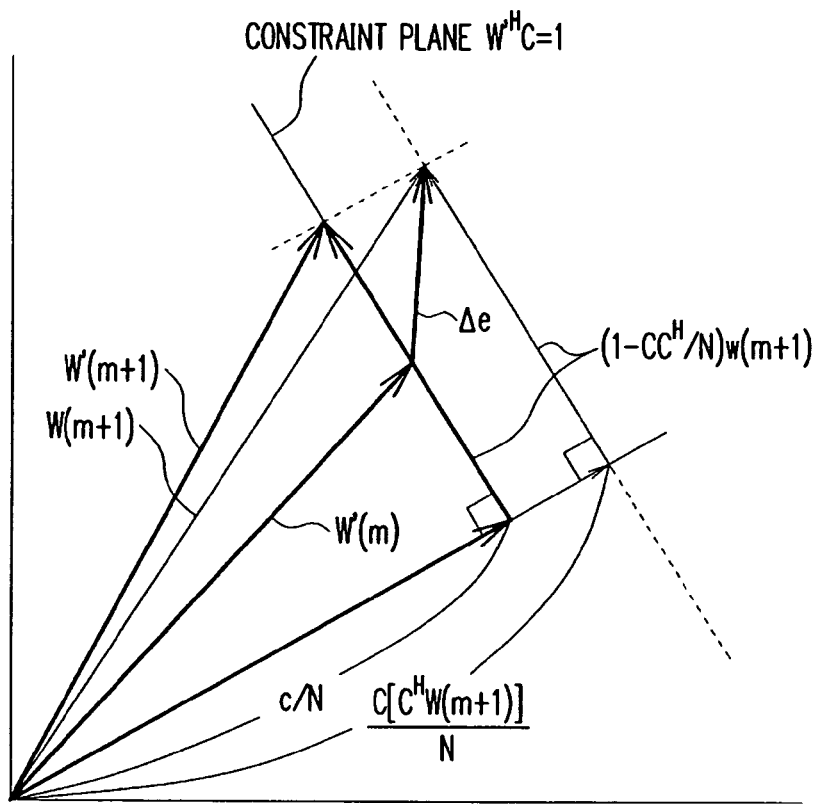
FIG. 7 is a diagram for explaining the direction constraint process performed by an antenna weight direction constraint section.
Figure 8:
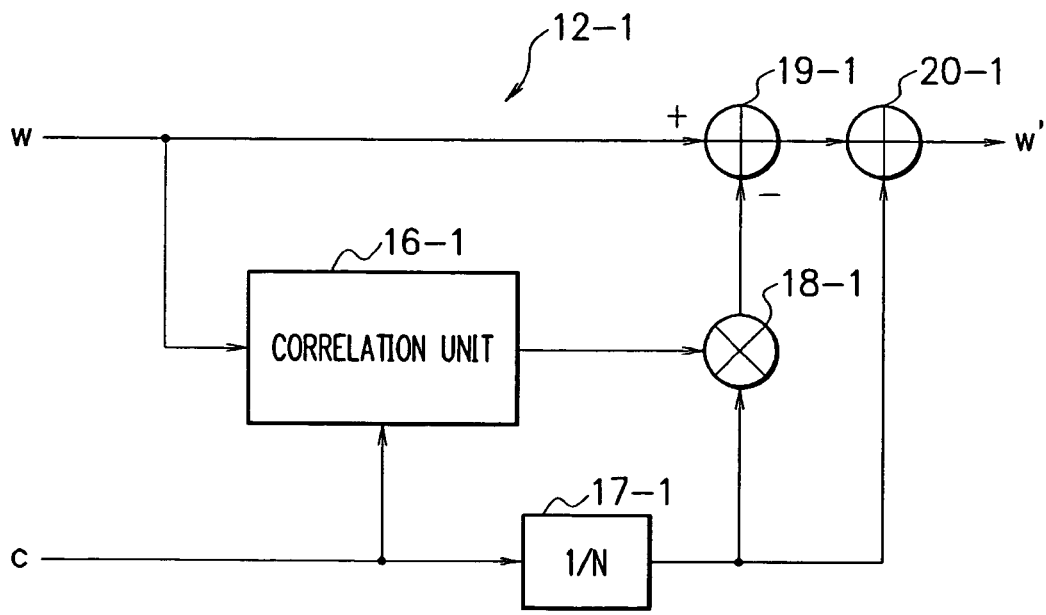
FIG. 8 is a block diagram showing the construction of the antenna weight direction constraint section.
Figure 9:
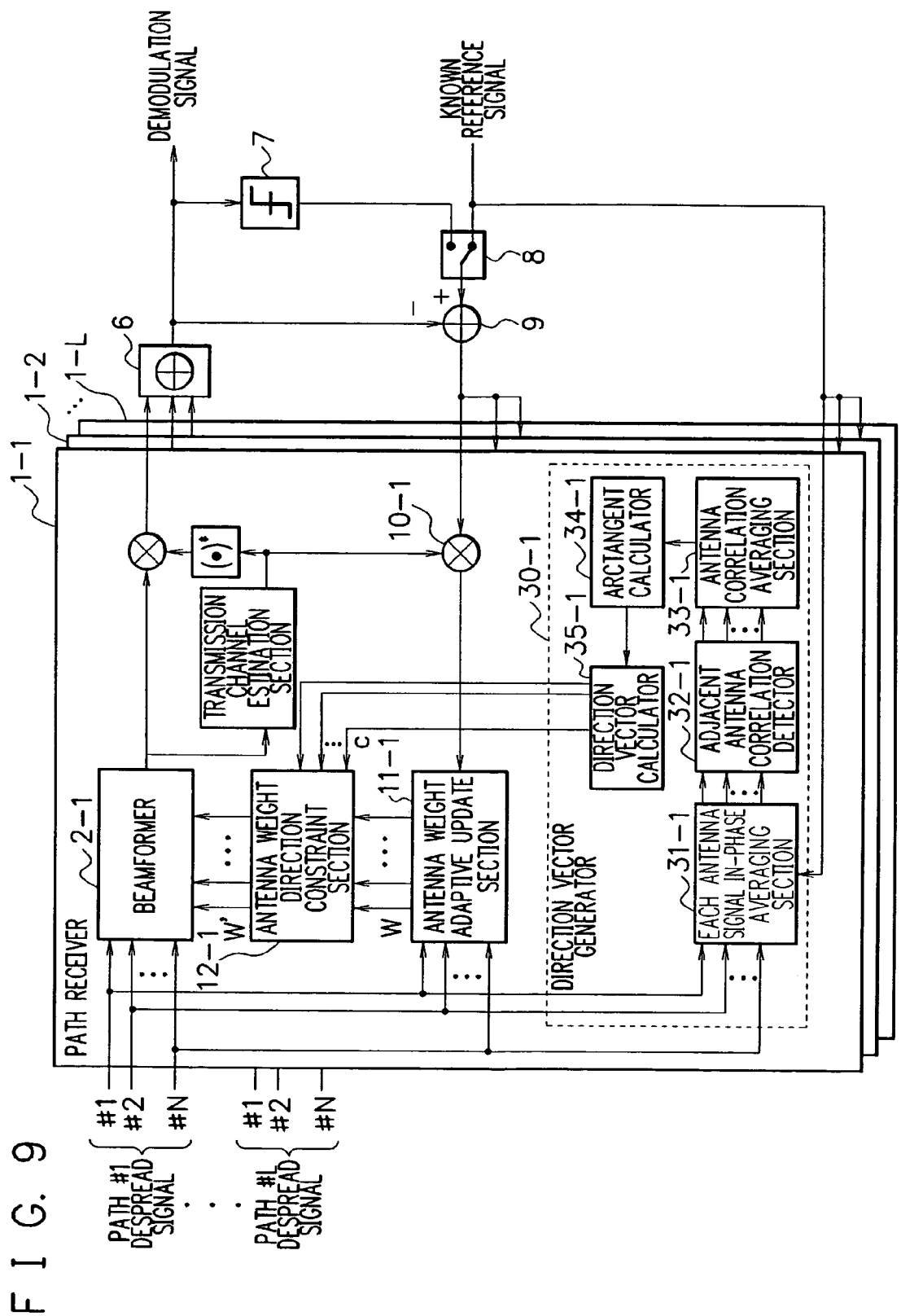
FIG. 9 is a block diagram showing the construction of an adaptive antenna receiver according to another embodiment of the present invention.

1-1 to 1-L Path receivers
2-1 to 2-L Beamformer
3-1 to 3-L Transmission channel estimation section
4-1 to 4-L Complex conjugate operation section
5-1 to 5-L, 10-1 to 10-L, 14-1-1 to 14-L-N, 18-1 to 18-L Multiplier
6, 15-1 to 15-L Combiner
7 Determination unit
8 Switch
9, 19-1 to 19-L Subtractor
11-1 to 11-L Antenna weight adaptive update section
12-1 to 12-L Antenna weight direction constraint section
13-1-1 to 13-L-N Complex conjugate operation section
16-1 to 16-L Direction vector generator
17-1 to 17-L Divider
20-1 to 20-L Adder
30-1 to 30-L Direction vector generator
31-1 to 31-L Each antenna signal in-phase averaging section
32-1 to 32-L Adjacent antenna correlation detector
33-1 to 33-L Antenna correlation averaging section
34-1 to 34-L Arctangent calculator
35-1 to 35-L Direction vector calculator

The invention claimed is:

1. An adaptive antenna reception method, in which the directional beam of an array antenna consisting of a plurality of antenna elements is adaptively formed to receive a desired signal as well as to suppress interference signals in multiplexed signals transmitted from a plurality of senders, and the desired signal is corrected based on transmission channel estimation, the method comprising:

a first step of adaptively updating antenna weight based on minimum mean squared error (MMSE) control according to signals received by the respective antenna elements and an error signal obtained from the desired signal corrected based on the transmission channel estimation;

a second step of correcting the antenna weight obtained in the first step using a direction vector to maintain a correlation between the antenna weight and the direction vector constant;

a third step of receiving the desired signal through the array antenna using the antenna weight which has undergone the correcting process in the second step; and a fourth step of estimating the transmission channel of the desired signal received in the third step to correct the desired signal based on the estimation result.

2. The adaptive antenna reception method claimed in claim 1, wherein, in the second step, a process in accordance with the following equation is performed:

$$W'(i, m+1) = \left(I - \frac{c(i,m)c^H(i,m)}{N}\right)W(i, m+1) + \frac{c(i,m)}{N}$$

such that the following equation is satisfied:

$w'^H c = 1$, where W' is an antenna weight vector obtained from an antenna weight vector W projected in the adaptively updating step on a constraint plane in N-dimensional antenna weight vector space, I is the identity matrix, H is the Hermitian conjugate operation, c is the direction vector to maintain a beam gain of a desired signal constant in the arrival direction of the desired signal, i is a path number with symbol number m, the direction vector is denoted by c(i, m) and the antenna weight obtained by the antenna weight adaptively updating step is denoted by w'(i, m).

3. The adaptive antenna reception method claimed in claim 2, further comprising:
a fifth step of obtaining a correlation value between signals received by the respective adjacent antenna elements;
a sixth step of calculating the average of the correlation values obtained in the fifth step;
a seventh step of calculating the arctangent of the average obtained in the sixth step to find the phase; and
an eighth step of calculating a direction vector based on the phase obtained in the seventh step.

4. The adaptive antenna reception method claimed in claim 1, wherein:
the first to fourth steps are performed with respect to, at least, one path; and
the desired signals corrected in the fourth step are combined to generate a multipath combined demodulation signal.

5. An adaptive antenna receiver, which adaptively forms the directional beam of an array antenna consisting of a plurality of antenna elements to receive a desired signal while suppressing interference signals in multiplexed signals transmitted from a plurality of senders, and corrects the desired signal based on transmission channel estimation, the adaptive antenna receiver comprising:
an antenna weight adaptive update means for adaptively updating the antenna weight based on minimum mean squared error (MMSE) control according to signals received by the respective antenna elements and an error signal obtained from the desired signal corrected based on the transmission channel estimation;
an antenna weight correcting means for correcting the antenna weight obtained by the antenna weight adaptive update means using a direction vector to maintain the correlation between the antenna weight and the direction vector constant;
a beamformer for receiving the desired signal through the array antenna using the antenna weight which has undergone the correcting process performed by the antenna weight correcting means; and
a transmission channel estimation means for estimating the transmission channel of the desired signal received by the beamformer to correct the desired signal based on the estimation result.

6. The adaptive antenna receiver claimed in claim 5, wherein the antenna weight correcting means performs a process in accordance with the following equation:

$$W'(i, m+1) = \left(I - \frac{c(i,m)c^H(i,m)}{N}\right)W(i, m+1) + \frac{c(i,m)}{N}$$

such that the following equation is satisfied:

$w'^H c = 1$, where W' is an antenna weight vector obtained from an antenna weight vector W projected in the adaptive updating means on a constraint plane in N-dimensional antenna weight vector space, I is the identity matrix, H is the Hermitian conjugate operation, c is the direction vector to maintain a beam gain of a desired signal constant in the arrival direction of the desired signal, i is a path number with symbol number m, the direction vector is denoted by c(i, m) and the antenna weight obtained by the antenna weight adaptive updating means is denoted by w'(i, m).

7. The adaptive antenna receiver claimed in claim 6, further comprising:
an adjacent antenna correlation detection means for obtaining a correlation value between signals received by the respective adjacent antenna elements;
an antenna correlation averaging means for calculating the average of the correlation values obtained by the adjacent antenna correlation detection means;
an arctangent calculation means for calculating the arctangent of the average obtained by the antenna correlation averaging means to find the phase; and
a direction vector calculation means for calculating a direction vector based on the phase obtained by the arctangent calculation means.

8. The adaptive antenna receiver claimed in claim 5, further comprising a combine means for multipath combining at least one desired signal received through each path to generate a demodulation signal.

* * * * *